United States Patent [19]

Kunz et al.

[11] 4,363,290

[45] Dec. 14, 1982

[54] METHOD AND APPARATUS FOR AUTOMATED IMMERSION TREATMENT OF FISH

[75] Inventors: Lee R. Kunz, Golden; Guy L. Tebbit, Lakewood, both of Colo.

[73] Assignee: Wildlife Vaccines, Inc., Wheat Ridge, Colo.

[21] Appl. No.: 277,534

[22] Filed: Jun. 26, 1981

[51] Int. Cl.³ ............................................. A01K 63/00
[52] U.S. Cl. ......................................................... 119/3
[58] Field of Search ........................................ 119/3, 5

[56] References Cited

U.S. PATENT DOCUMENTS 1,252,500 1/1918 Schnoor .................................. 119/5
4,282,828 8/1981 Johnson ................................... 119/3

Primary Examiner—Hugh R. Chamblee
Attorney, Agent, or Firm—Beveridge, DeGrandi & Kline

[57] ABSTRACT

An automated immersion apparatus is described which is used for the treatment of fish with various vaccines and the like to prevent diseases in fish. The apparatus comprises a means to convey fish into a reservoir of the vaccine material and then to convey the fish out of the reservoir and release them to the environment.

13 Claims, 3 Drawing Figures

METHOD AND APPARATUS FOR AUTOMATED IMMERSION TREATMENT OF FISH

The present invention relates to a new method and apparatus for the controlled automated immersion of fish to provide a treatment against fish diseases. More particularly, the present invention provides a method and apparatus for automated vaccination of fish for treatment against outbreaks of diseases as well as a preventive measure to guard against infection where it has been determined that there is a danger or risk of infection of the fish or other water living animals by bacteria or virus.

The apparatus of the present invention embodies a portable device that is readily transportable to the site of treatment, typically a fish hatchery. Being easily assembled and conveyed to the place of treatment, the device requires only one or two persons for its operation. By regulating the speed of the device, it is possible to control the amount of treating agent that the fish will be exposed to; that is, the dosage delivered to the fish can be controlled within prescribed limits to permit an accurate and precise vaccination of the fish with the health and/or welfare enhancing agent.

Fish and other water living animals are susceptible to outbreaks of disease caused by both bacteria and various infectious virus in water ways. Commercial fisheries have invested millions of dollars in harvesting, processing and marketing equipment. Serious problems involving substantial reduction in fish populations in various streams, rivers and lakes have been experienced in the recent past. Therefore, the industry and government have sought ways to control the disease problems in order to maintain fish populations. A variety of techniques, systems and compositions have been proposed over the years with varying degrees of success.

Fish are particularly susceptible to many highly infectious diseases and it has been observed that an epidemic may wipe out the entire or substantially entire fish population in a particular location. Hatchery propagation of various fish species has been wide spread but these are seriously affected by the danger of various diseases, particularly viruses such as the Infectious Hematopoetic Necrosis (IHN). Because of the large number of animals involved in intensive culture, it is not economically feasible to inject them with vaccines using a needle, on a commercial basis. Therefore, various groups have sought means for a rapid, efficient and effective way for treating fish with various health and/or welfare enhancing agents.

Whereas some previous methods have resorted to permitting fish to swim through large holding tanks or introducing various vaccines and bacterins into holding ponds, such methods have not been sufficiently precise to permit a close control over the dosage of the material to which the fish is exposed.

By the term "health and/or welfare enhancing agent" it is intended to include antigens, vaccines, serums, bacterins, chemotherapeutants and the like which function ultimately to bring about an improvement in the health of the water living animal. The specific health and/or welfare enhancing medium, vehicle or composition is not critical for the practice of this invention and does not form a part of this invention. Numerous viral and microbial infections of fish and other water living animals including shell fish can be treated in accordance with the method and apparatus of the invention, provided non-toxic amounts of materials are used.

Antigens and the like suitable for use with the invention have been described in the art and are well known. Methods of producing health and/or welfare enhancing agents are also known. Any such suitable materials may be used for purposes of the invention. Compositions shown in Ament et al, U.S. Pat. No. 4,009,250 are noted in this regard. Other examples include the many newly available vaccines, antibiotics and the like with which this art is familiar.

The apparatus of the invention comprises a housing including two essentially parallel walls of a major dimension and an end wall of minor dimension, thereby forming a generally rectilinear housing which is arranged so as to accommodate a conveyor means which is inclined with respect to the horizontal plane. The housing is closed at one end which corresponds to the lower end of the conveyor means, relative to the angle of inclination. The walls of the housing form on the interior thereof a reservoir tank for the treating liquid which contains the health and/or welfare enhancing agent.

Located inside the housing is a conveying means; for example, a conveyor belt, the major axis of which corresponds generally to the major dimension of said housing and being essentially parallel thereto in a vertical plane. This conveying means is disposed at an angle to the horizontal forming an inclined plane and arranged so that one end of the conveyor belt is a lower end and the opposite end of the conveying means is the upper end. At each of the two opposite ends, the continuous belt moves around an axle or roller. The two major surfaces of the conveyor belt are parallel to each other. The housing itself may also be inclined to conform with the angle of the conveyor belt. The lower end of the conveyor belt is located in the lower end of the housing and the upper end of the belt is located in the upper end of the housing. Generally, the upper end of the housing is open to the atmosphere although it too may be enclosed by an end wall.

Attached to the conveyor belt, at spaced apart locations are a plurality of partitions or wall-like elements. The latter are attached or mounted on the conveying means and forms an angle of 90° with regard to the point where it is attached to the conveyor belt. The dimensions of the partitions are such as to define at least one, preferably a plurality of, compartments or holding areas for holding or containing the fish as they travel through the reservoir. The partition walls are approximately as wide as the conveyor belt and extend radially outward from the conveyor belt towards the top of the housing as the partition elements move along the top of the conveyor belt. At the lower end of the conveyor belt as it dips into the reservoir, the partitions define a semicircle or arc as they move around the lower axle of the conveyor means. This arc corresponds essentially to the internal shape of the housing in the area of the reservoir. The partition elements are preferably perforated and may be made of any suitable material such as metal, plastic and the like. The function of the partition elements are to define various compartments; that is, a plurality of compartments located on the conveyor belt and arranged so as to accept the fish and hold or retain the fish while they travel through the reservoir of liquid treating agent.

The fish may be inserted at the top of the housing through any convenient opening of any size, shape or configuration. The conveyor belt can be arranged to move at any desired speed depending upon the desired, pre-determined dwell time for the fish in the reservoir holding area. The fish are placed in any compartment on the conveyor belt, defined by two spaced apart partition elements, and with the speed of the conveyor belt being adjustable, the fish travel down the inclined plane into the reservoir tank area. As the belt travels downwardly along the inclined plane and the leading partition wall begins to submerge itself into the reservoir tank, the liquid in the reservoir moves through the holes or perforations into the compartment and into contact with the fish. As the conveyor belt moves around the lower end of the conveyor belt; i.e. around the roller or axle, and the partition element rotates with the belt around the axle and becomes inverted relative to its position at the beginning of the cycle. Because the partition wall is dimensioned to conform with the interior dimensions of the housing, the fish are retained in the compartment and move down around into the reservoir area for the immersion treatment.

Then at the conclusion of the cycle with the conveyor belt moving at a pre-determined speed, the partition elements forming the compartments move up out of the reservoir and the fluid drains out the perforated holes of the lower compartment wall. At the upper end of the cycle, the upper or forward partition element wall rotates around the upper axle end with a conveyor belt thereby resulting in an opening permitting the fish to then leave the housing through a chute, funnel or any other convenient means of exiting. Thereupon, the fish can be readily returned directly or indirectly to the lake, stream, river or other environment from which they were originally taken.

The housing may be mounted in any convenient manner, for example, on legs, braces, brackets or supporting means which can also be adapted to be adjustable to vary the angle of inclination of the housing and conveyor belt.

The invention will be further illustrated by reference to the accompanying drawings wherein.

Figure 1:
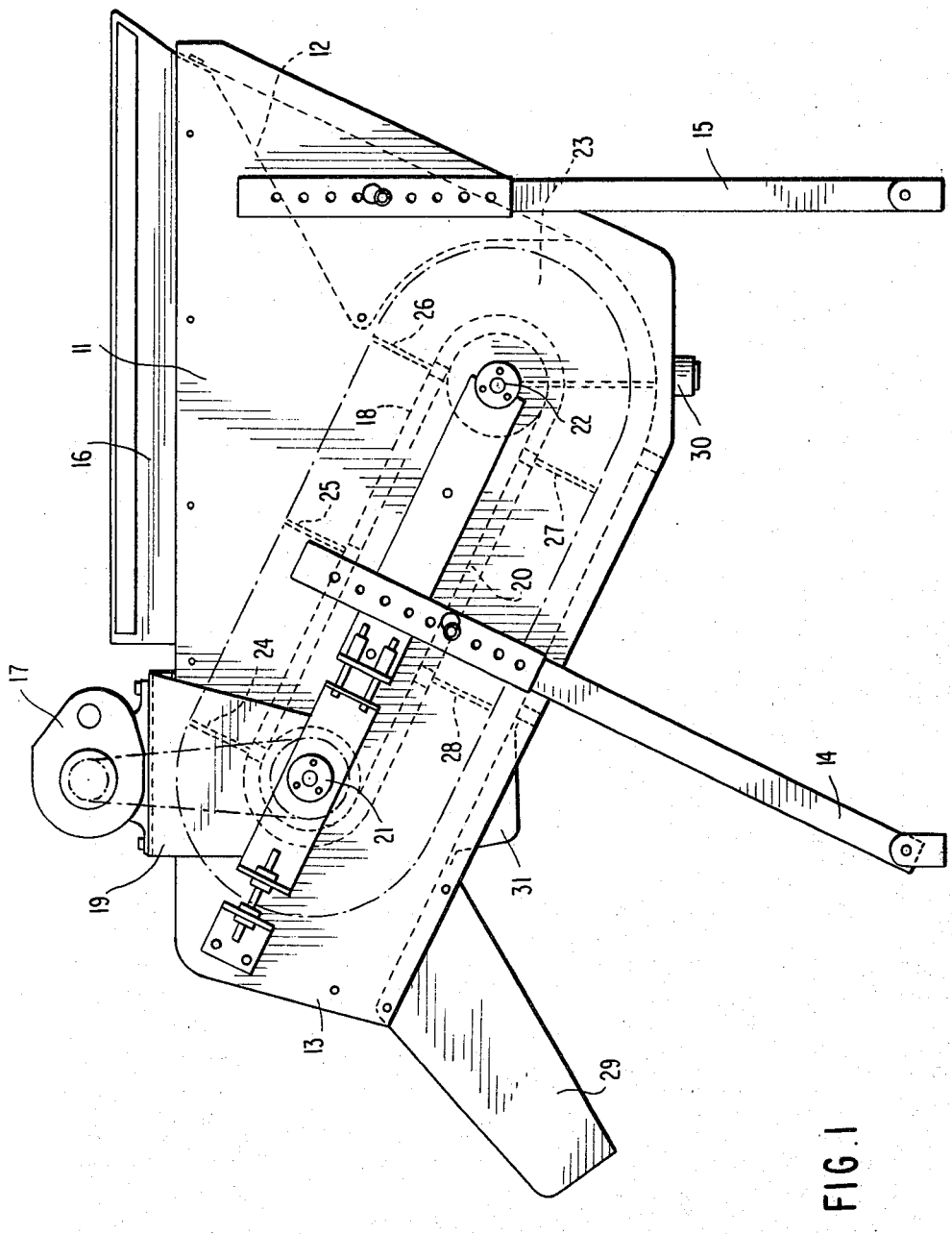
FIG. 1 is a side elevation section view of the apparatus of the invention.

In further detail, in FIG. 1, the housing 10 is formed of two parallel side walls 11 of major dimension, and an end wall 12 of minor dimension relative to the side walls 11. The housing is preferably open at the upper end 13 of the structure, however, another end wall of minor dimension may also be provided (not shown). As shown, housing 10 is arranged on an angle of elevation with regard to the horizontal plane. This angle may be varied as desired. The housing is supported by forward leg brace 14 and rear leg brace 15. On top of the housing is located an opening 16 for inserting the fish into the apparatus.

Motor 17 serves to drive the conveyor means 18 and is connected to the conveyor means by conventional pulley 19 or any other arrangement. The conveyor belt has two surfaces 20 which are parallel and opposite each other which rotate about an upper roller or axle 21 and a lower roller or axle 22. The lower axle and end of the conveyor is located fully or partially submerged in the reservoir tank area 23.

Figure 3:
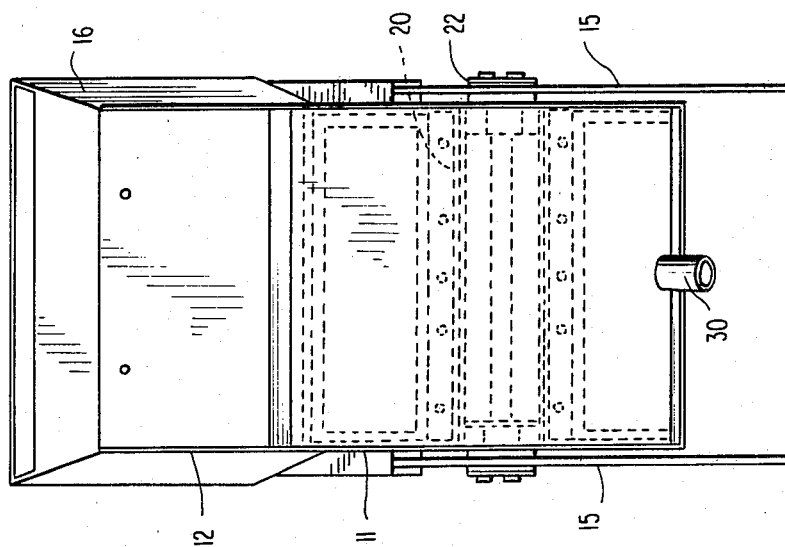
FIG. 3 is a sectional end view of the apparatus of the invention.
Figure 2:
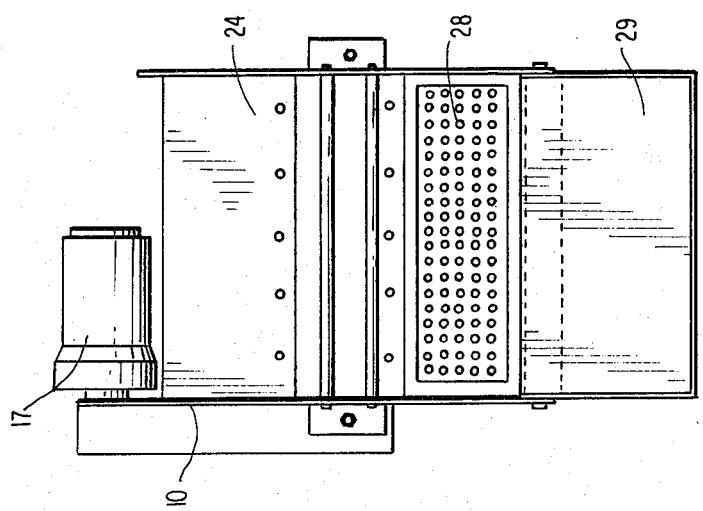
FIG. 2 is a sectional end view.

Partition walls or paddles 24, 25, 26, 27 and 28 are located at predetermined spaced apart locations along the conveyor belt and are attached to the conveyor belt in any convenient manner so as to permit rotation with the rotation about the terminal axles. The partition walls or paddles may be perforated as shown and are dimensioned so as to conform with the internal shape of the apparatus at the lower end of the housing defining the reservoir tank. Typically, the lower end may be arcuate or semicircular in shape as shown. The height of the partition wall corresponds to the dimensions of the housing and no particular size is critical. No side walls are attached to the conveyor belt as the conveyor belt is dimensioned so as to fit within the width of the housing. Therefore in operation, the side walls of the housing, which are fixed in place and do not move, thereby prevent fish from falling out of the compartment found by two adjacent partition walls. Thus, the width of the partition wall is just slightly narrower than the width of the housing as shown in FIGS. 2 and 3 in order to permit unobstructed travel of the partition walls along the conveyor belt.

A chute or slide plate 29 at the underside of the upper end of the apparatus permits the fish to readily return to the lake, pond or stream after the partition element wall rotates upwardly and out of the way resulting in the opening of the compartment and the freeing of the fish. As the compartment partition elements move upwardly out of the reservoir, the liquid drains out of the holes in the perforated elements of the compartment members.

Various modifications, variations and the like which will become apparent to a person skilled in the art after reading the foregoing, are intended to be encompassed by the claims appended hereto.

We claim:

1. An apparatus for the immersion treatment of fish which comprises a housing, a reservoir located within said housing and containing a liquid for immersion of the fish, said liquid containing a health and/or welfare enhancing agent for the fish, conveying means located within said housing and arranged in an inclined plane relative to the horizontal, said conveying means having at least two axles about which said conveying means rotates, one of said axles being located at the lower end of said inclined plane and located within the area of the reservoir liquid, a means for transporting fish into said liquid for immersion of said fish, said transporting means attached to said conveying means, means for controlling the speed of said conveying means, whereby the total time period of immersion of the fish in said liquid is controllable, and means for returning said fish to their environment.

2. The apparatus as defined in claim 1, wherein said means for transporting fish is attached to said conveying means and arranged on an inclined plane so that said fish move downwardly along said inclined plane into said reservoir for immersion in said liquid and thereafter said fish are moved upwardly along said inclined plane out of said reservoir.

3. The apparatus as defined in claim 2, wherein the means for transporting said fish are a plurality of spaced apart elements mounted on said conveying means on said inclined plane which moves downwardly into said reservoir, said means for transporting said fish being adapted to rotate about the lower end of the inclined plane and move upwardly out of said reservoir.

4. The apparatus as defined in claim 2, wherein said means for transporting fish is formed of upright partitions located at spaced intervals along said conveying means and being attached thereto, said partitions being perforated to permit the liquid to drain when said means for transporting said fish moves upwardly out of the reservoir on the inclined plane.

5. The apparatus as defined in claim 1, wherein said apparatus further includes a means for introducing said fish into said apparatus through an opening located at the top of said apparatus.

6. The apparatus as defined in claim 1, wherein support means for holding the housing are mounted on said apparatus, said support means including means for adjusting the angle of the inclined plane of said conveying means relative to the horizontal.

7. The apparatus as defined in claim 1, wherein the means for transporting the fish are mounted on the conveying means which is a continuous belt mounted on and rotating around an axle located at each opposite end of the conveyor belt, so as to form a continuously moving transporting means which moves into and immerses in said reservoir and then passes therethrough, moves around on the end of the conveyor belt located in said reservoir and moves out of said reservoir along the inclined plane.

8. The apparatus as defined in claim 7, wherein the conveyor belt has two opposite axles, one end of the said conveyor belt being located in said reservoir of liquid and the opposite upper end of the conveyor belt being located outside the reservoir and elevated above the end of the conveyor which is located in said reservoir.

9. The apparatus as defined in claim 1, wherein said transporting means has a forward and an aft perforated barrier, relative to the direction of movement of said conveying means, permitting liquid to enter an area for holding said fish and permitting the liquid to leave said holding area, the size of said holding area being determined by the distance between said forward and aft barrier and the two opposite retaining walls of said apparatus.

10. The apparatus of claim 1, comprising a housing including two essentially parallel sides of major dimension, and two sides of minor dimension, said housing further containing a conveyor belt arranged on an inclined plane, the conveyor belt being of a width corresponding to the spacing between the opposite parallel walls of the housing and dimensioned so as to permit movement of said conveyor belt without obstruction, said conveyor belt having mounted thereon a plurality of partitions extending at an angle of 90° to said conveyor belt, said partitions being perforated, the partitions forming a series of compartments for fish thereby enabling the compartment to be filled with fish for immersion into a reservoir of liquid located in the housing at the lower end of the inclined housing, said conveyor belt having an upper and a lower end, the lower end of said conveyor belt being submerged in said reservoir of liquid and the upper end thereof being above the level of the reservoir, the partitions defining the compartment being attached to said conveyor belt and being capable of rotating therewith around an axle at each end of the conveyor belt, the housing being dimensioned so as to permit the moveable compartment wall to move freely inside the housing along with the belt.

11. A method for treating fish to prevent or treat various diseases of fish comprising placing fish on a moving conveyor belt which automatically conveys the fish down into a reservoir of liquid containing a health and/or welfare enhancing agent for the fish, immersing the fish for a sufficient period of time and then conveys the fish up out of the reservoir at a predetermined time and thereupon permitting the treating liquid to drain from the fish and thereafter returning fish to their environment.

12. The method for treating fish to prevent or treat various diseases of fish comprising placing fish into a holding tank formed of two spaced apart, perforated holding walls mounted on a conveyor belt, the sides of said holding tank corresponding essentially to the opposite parallel walls of a housing for said conveyor belt and containing a reservoir liquid, said reservoir liquid containing a health and/or welfare enhancing agent for the fish, the holding tank being attached to and mounted on a conveyor belt thereby permitting the fish to travel along said conveyor belt down into the reservoir liquid for immersion of the fish in the reservoir liquid for a predetermined period of time sufficient to impart the desired treatment to the fish, said perforated walls rotating around a terminal lower axle point of the conveyor belt and returning up out of the reservoir liquid thereby permitting the liquid to drain from the fish, and at the upper end of the conveyor belt the moving wall rotates upwardly and the fish drop down into a chute to return to their environment.

13. The method for treating fish to prevent or treat various diseases of fish comprising placing fish into holding means mounted on a conveyor belt, the sides of said holding means corresponding essentially to the opposite parallel walls of a housing for said conveyor belt and containing a reservoir liquid, said reservoir liquid containing a health and/or welfare enhancing agent for the fish, the holding means being attached to and mounted on a conveyor belt thereby permitting the fish to travel along said conveyor belt down into the reservoir liquid for immersion of the fish in the reservoir liquid for a predetermined period of time sufficient to impart the desired treatment to the fish, said holding means rotating around a terminal lower axle point of the conveyor belt and returning up out of the reservoir liquid thereby permitting the liquid to drain from the fish, and at the upper end of the conveyor belt the holding means permits the fish to drop down into a chute to return to their environment.

* * * * *